(12) United States Patent
Takeshima et al.

(10) Patent No.: US 9,079,752 B2
(45) Date of Patent: Jul. 14, 2015

(54) ELEVATOR GROUP SUPERVISORY CONTROL SYSTEM AND METHOD WITH PARK FLOOR CANCELLATION

(75) Inventors: Koji Takeshima, Nagoya (JP); Masayuki Mitsuda, Nagoya (JP); Yoshinori Nonami, Nagoya (JP); Sakurako Tokura, Tokyo (JP); Naohiko Suzuki, Tokyo (JP); Yoshimasa Koba, Tokyo (JP); Masafumi Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 743 days.

(21) Appl. No.: 13/395,158

(22) PCT Filed: Nov. 19, 2009

(86) PCT No.: PCT/JP2009/006208
§ 371 (c)(1),
(2), (4) Date: Mar. 9, 2012

(87) PCT Pub. No.: WO2011/061797
PCT Pub. Date: May 26, 2011

(65) Prior Publication Data
US 2012/0168261 A1 Jul. 5, 2012

(51) Int. Cl.
*B66B 1/18* (2006.01)
*B66B 1/46* (2006.01)
*B66B 1/24* (2006.01)

(52) U.S. Cl.
CPC ............... *B66B 1/468* (2013.01); *B66B 1/2458* (2013.01); *B66B 2201/241* (2013.01); *B66B 2201/243* (2013.01); *B66B 2201/463* (2013.01); *B66B 2201/4623* (2013.01); *Y02B 50/122* (2013.01)

(58) Field of Classification Search
CPC ..................... B66B 2201/22; B66B 2201/226; B66B 2201/234; B66B 2201/241; B66B 2201/242; B66B 1/468; B66B 1/2458; B66B 2201/4623; B66B 2201/463; B66B 2201/243; Y02B 50/122
USPC .......................... 187/247, 380–388, 391, 393
See application file for complete search history.

(56) References Cited

U.S. PATENT DOCUMENTS 4,345,670 A * 8/1982 Kaneko et al. ................. 187/248
4,790,412 A * 12/1988 MacDonald et al. ......... 187/387
(Continued)

FOREIGN PATENT DOCUMENTS

| CN | 1243493 A | 2/2000 |
|---|---|---|
| JP | 54 93538 | 7/1979 |

(Continued)

OTHER PUBLICATIONS

U.S. Appl. No. 13/510,326, filed May 17, 2012, Mitsuda, et al.
(Continued)

*Primary Examiner* — Anthony Salata
(74) *Attorney, Agent, or Firm* — Oblon, McClelland, Maier & Neustadt, L.L.P.

(57) ABSTRACT

According to the present invention, when a parking floor is set as a remote-hall-operating-panel-installed floor, the parking floor can be canceled. As a result of this, during the movement of a passenger from a remote hall operating panel to an elevator hall, it is possible to prevent a car from being on standby at a remote-hall-operating-panel-installed floor. Therefore, because a car to which a remote hall registration has been assigned can effectively use the moving time of the passenger and hence it is possible to improve the operation efficiency of the whole group supervisory control system. Furthermore, it is possible to reduce useless runs and hence to reduce power consumption.

8 Claims, 8 Drawing Sheets

(56) References Cited

U.S. PATENT DOCUMENTS

| | | | |
|---|---|---|---|
| 6,257,373 B1 | 7/2001 | Hikita et al. | |
| 7,392,883 B2 * | 7/2008 | Hikita | 187/249 |
| 7,581,622 B2 * | 9/2009 | Amano | 187/384 |
| 7,650,966 B2 * | 1/2010 | Sansevero et al. | 187/249 |
| 7,866,446 B2 * | 1/2011 | Lindegger | 187/393 |
| 8,439,169 B2 * | 5/2013 | Iio et al. | 187/387 |
| 8,490,754 B2 * | 7/2013 | Amano | 187/384 |
| 8,910,752 B2 * | 12/2014 | Furutani | 187/384 |
| 2009/0216376 A1 * | 8/2009 | Atalla et al. | 700/275 |
| 2010/0258383 A1 * | 10/2010 | Saarikoski et al. | 187/290 |
| 2012/0090922 A1 * | 4/2012 | Elomaa et al. | 187/247 |
| 2013/0186713 A1 * | 7/2013 | Suzuki | 187/385 |

FOREIGN PATENT DOCUMENTS

| | | |
|---|---|---|
| JP | 54 124461 | 9/1979 |
| JP | 55 56956 | 4/1980 |
| JP | 58 52164 | 3/1983 |
| JP | 60 209475 | 10/1985 |
| JP | 2002 220177 | 8/2002 |
| JP | 2009 221004 | 10/2009 |

OTHER PUBLICATIONS

Combined Chinese Office Action and Search Report issued Dec. 13, 2013 in Patent Application No. 200980162487.0 (with partial English language translation).

Office Action issued on Jul. 16, 2014 in the corresponding Chinese Patent Application No. 2009801624870 (with English Translation).

International Search Report Issued Apr. 20, 2010 in PCT/JP09/06208 Filed Nov. 19, 2009.

* cited by examiner

ELEVATOR GROUP SUPERVISORY CONTROL SYSTEM AND METHOD WITH PARK FLOOR CANCELLATION

TECHNICAL FIELD

The present invention relates to an elevator group supervisory control system having a remote hall operating panel and an elevator group supervisory control method.

BACKGROUND ART

There is a conventional elevator group supervisory control method which involves predicting a high-demand floor on the basis of learning data on the occurrence rate of elevator hall calls for each floor, determining a parking floor on the basis of the prediction result, and causing an empty car to be on standby at the parking floor (for example, Patent Literature 1).

Furthermore, for example, Patent Literature 2 discloses an elevator group supervisory control system having a remote hall operating panel installed in a place away from an elevator hall. In Patent Literature 2, the total of the non-response time which elapses from the occurrence of call registration in the remote hall operating panel until the arrival of a car at the floor on which the remote hall operating panel (hereinafter referred to as the remote-hall-operating-panel-installed floor) is installed and the door-open time during which the car is on standby at the remote-hall-operating-panel-installed floor is made equal to the moving time during which passengers move from the remote hall operating panel to the elevator hall.

CITATION LIST

Patent Literature

Patent Literature 1: Japanese Patent Laid-Open No. 60-209475 (for example, page 2 upper right column, FIG. 17, FIG. 18)
Patent Literature 2: Japanese Patent Laid-Open No. 2002-220177 (for example, paragraphs 0019 to 0020)

SUMMARY OF INVENTION

Technical Problem

However, in an elevator group supervisory control system in which a car is caused to be on standby on a parking floor as in Patent Literature 1, for example, in the case where the parking floor is set as a remote-hall-operating-panel-installed floor, if as in Patent Literature 2 the total of non-response time and door-open time is regarded as the moving time, then the non-response time of a car on standby at the remote-hall-operating-panel-installed floor is zero and hence door-open time and moving time become equal. Then during the movement of the passengers from the remote hall operating panel to the elevator hall, this car is only on standby waiting for door opening and cannot respond to car call registration occurring from other floors, posing the problem that the operation efficiency of the elevator worsens. And, during the movement of the passengers from the remote hall operating panel to the elevator hall, it is not unnecessary for a car to be on standby at the remote-hall-operating-panel-installed floor and hence it is useless for a car to be on standby during the moving time. However, the car which has becomes an empty car is dispatched to the remote-hall-operating-panel-installed floor, which is a parking floor, posing the problem that power consumption increases due to a useless run from the floor at which the last passenger has got out of the car to the remote-hall-operating-panel-installed floor.

Means for Solving the Problems

An elevator group supervisory control system of the present invention includes hall call means which is provided in an elevator hall and performs registration of a hall call, remote hall call means which is provided in a place away from the elevator hall and performs registration of a hall call, parking floor determination means which determines a first parking floor intended for causing an empty car to be on standby and parking floor cancel means which cancels the first parking floor when the first parking floor determined by the parking floor determination means and remote-hall-call-means-installed floor on which the remote hall call means is provided are the same.

An elevator group supervisory control method of the present invention includes a parking floor determination step for determining a first parking floor intended for causing an empty car to be on standby and a parking floor cancel step for canceling the first parking floor when the first parking floor determined in the parking floor determination step and a remote-hall-call-means-installed floor which is provided in a place away from an elevator hall and is provided with remote hall call means which performs the registration of a hall call are the same.

Advantageous Effects of Invention

According to the present invention, because a parking floor is prevented from being set as a remote-hall-operating-panel-installed floor, it is possible to improve the operation efficiency of the elevators and it is possible to reduce useless runs.

DESCRIPTION OF SYMBOLS 1 group supervisory controller,
3 elevator,
4 hall button,
5 remote hall operating panel,
6 building,
10 control section.

DESCRIPTION OF EMBODIMENTS

Embodiment 1

Referring to FIGS. 1 to 4, Embodiment 1 of the present invention will be described.

Figure 1:
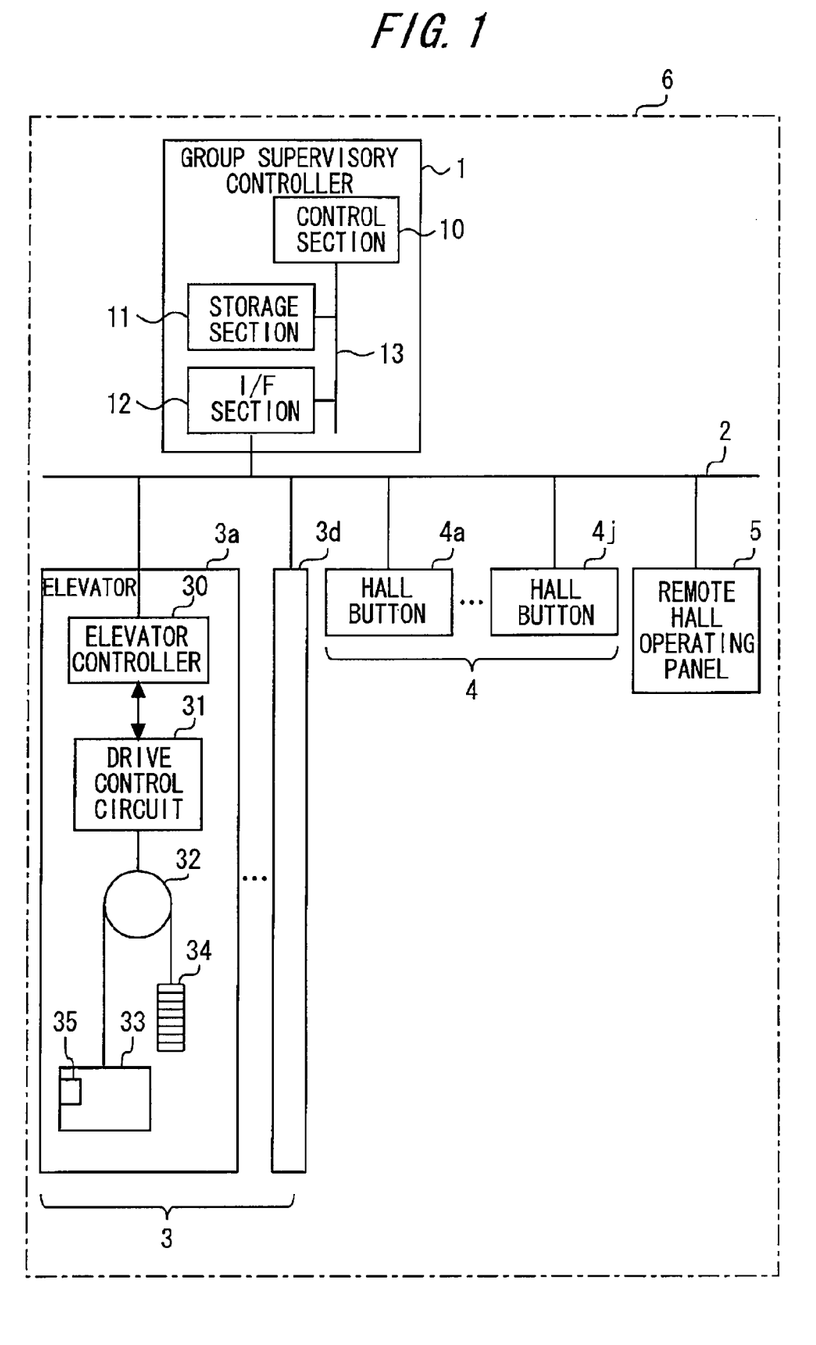
FIG. 1 is a general block diagram showing a group supervisory control system in Embodiment 1.
Figure 2:
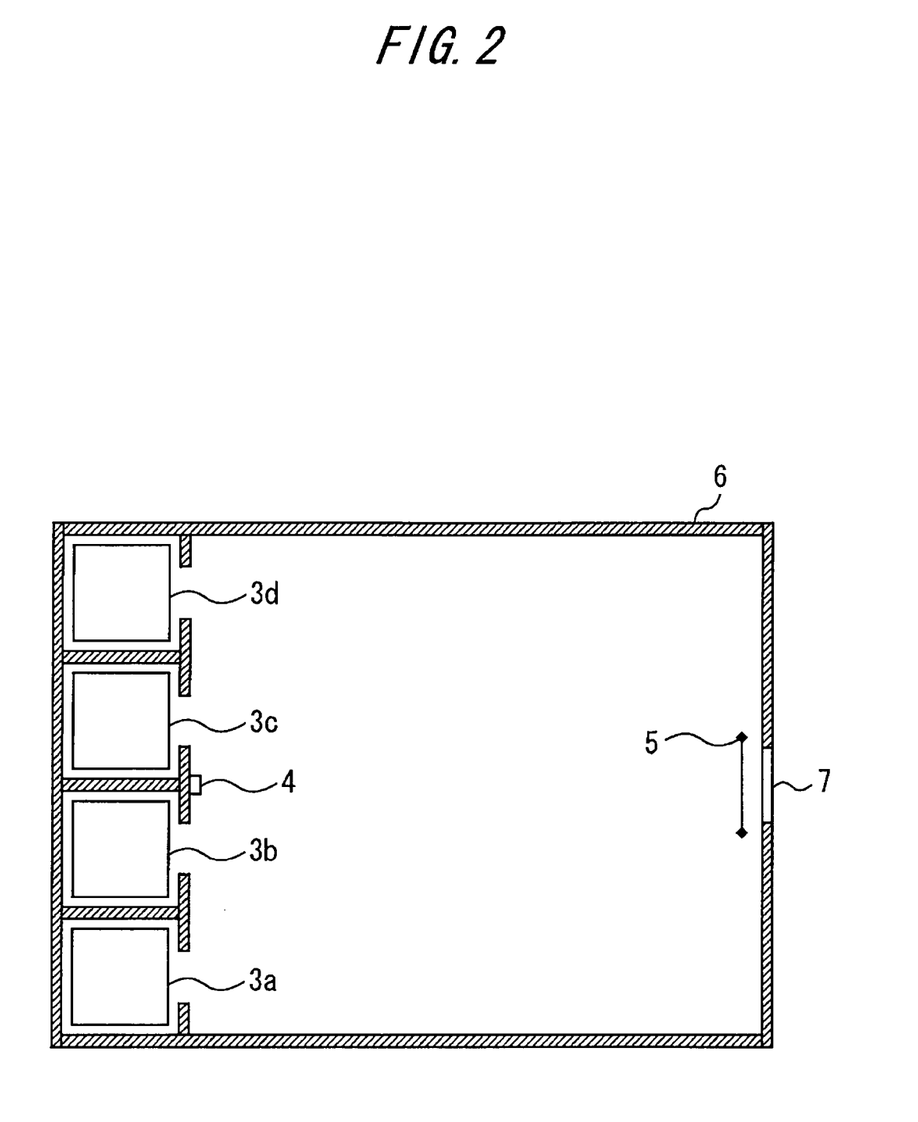
FIG. 2 is a horizontal sectional view of a remote-hall-operating-panel-installed floor of the building where the group supervisory control system in Embodiment 1 is provided.
Figure 3:
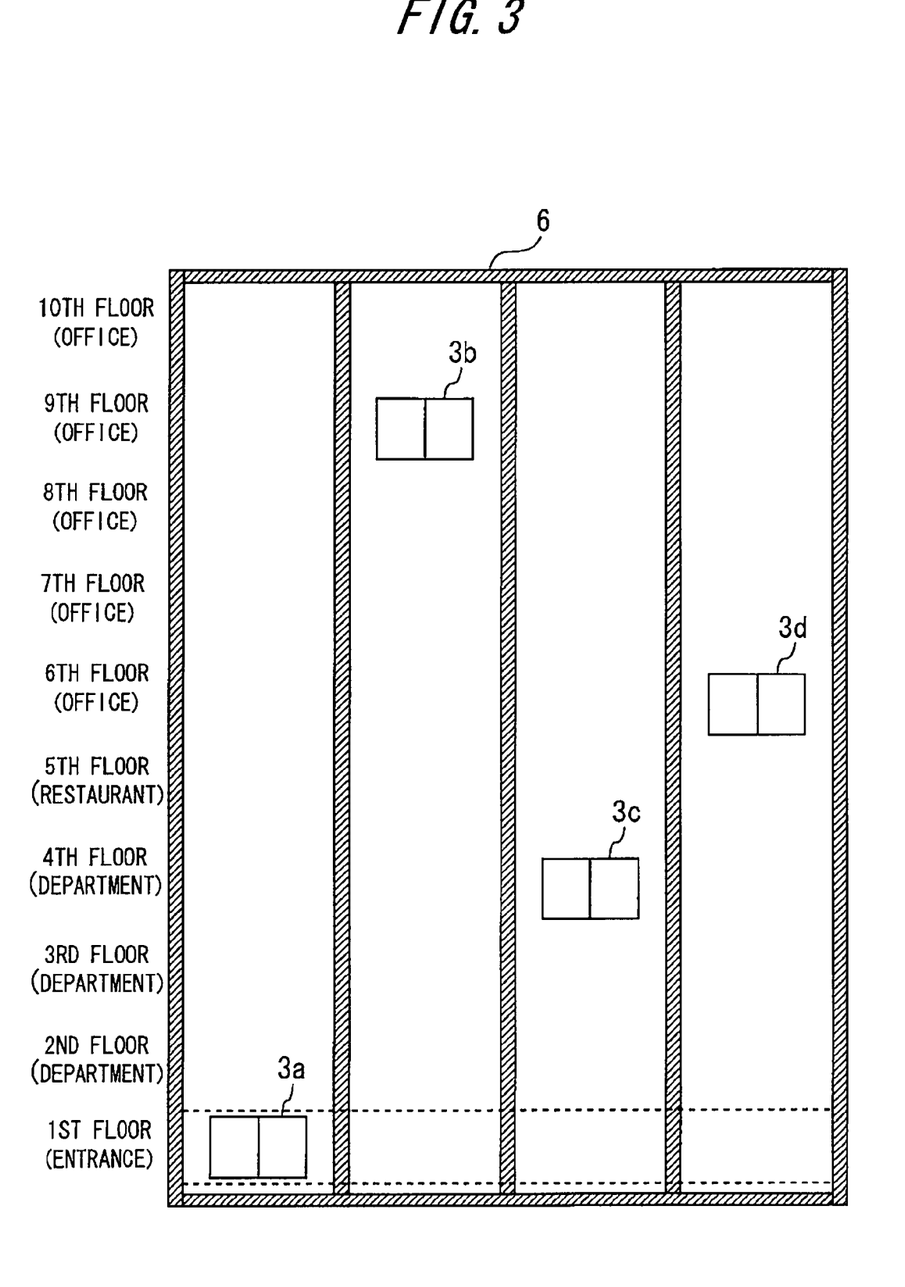
FIG. 3 is a longitudinal sectional view of the building where group supervisory control system in Embodiment 1 is provided.

First, referring to FIGS. 1 to 3, the configuration of a group supervisory control system in Embodiment 1 will be described. FIG. 1 is a general block diagram showing a group supervisory control system in Embodiment 1. FIG. 2 is a horizontal sectional view of a remote-hall-operating-panel-installed floor of the building where the group supervisory control system in Embodiment 1 is provided. FIG. 3 is a longitudinal sectional view of the building where group supervisory control system in Embodiment 1 is provided.

As shown in FIGS. 2 and 3, the building 6 is a 10-storied building composed of the 1st floor to the 10th floor. The 1st floor is an entrance floor where there is an entrance to the building, the 2nd to 4th floors are department floors where stores line up, the 5th floor is a restaurant floor where restaurant line up, and the 9th and 10th floors are office floors. Within the building 6, the elevator 3 of four elevators 3a to 3d, a hall button 4 composed of 10 units 4a to 4j, each being provided in the elevator hall of each floor, a remote hall operating panel 5 which is provided in a place away from the elevator hall of the first floor, and a group supervisory controller 1, which are connected to a bus 2. Here, "elevator" in the elevator 3 above refers to one elevator by the car.

Next, the configuration of the elevator 3 will be described. A car 33 and a weight 34 are lifted and lowered by a traction machine 32, and the traction machine 32 is drive-controlled by a drive control circuit 31. An elevator controller 30 is connected to a bus 2, and controls the drive control circuit 31 on the basis of a control command received from a group supervisory controller 1 via the bus 2. The elevator controller 30 and the drive control circuit 31 are housed in a control panel (not shown) of the elevator 3. Furthermore, within the car 33, a car operating panel 35 by use of which a passenger registers a car call by inputting destination floor information. Here, "car call" is a command issued to the elevator controller 30 to the effect that the car 33 is caused to be dispatched to the destination floor on the basis of the destination floor information inputted by use of the car operating panel 35. Incidentally, upon input of the destination floor information by the car operating panel 35 the elevator controller 30 transmits car call registration information based on this destination floor information to the group supervisory controller 1.

Next, the hall button 4 has an upward button and a downward button in order that the passenger registers a hall call by inputting the information on the destination floor direction. However, the hall button 4 provided on the 1st floor which is the lowest floor has only an upward button, and the hall button 4 provided on the 10th floor which is the highest floor has only a downward button. Here, "hall call" refers to a command issued to the group supervisory controller 1 on the basis of the information on the destination floor direction inputted by use of the hall button 4 to the effect that the car 33 is caused to be dispatched to the floor where the hall button 4 by use of which this information on the destination floor direction has been inputted is provided (hereinafter referred to as the "hall-call-registered floor"), and that after the passengers get on of the car, the car 33 is caused to run from the hall-call-registered floor in the destination floor direction. Furthermore, "destination floor direction" refers to the direction from a hall-call-registered floor to a destination floor. Incidentally, upon input of the information on the destination floor direction, the hall button 4 transmits this information on the destination floor direction to the group supervisory controller 1.

Next, as shown in FIG. 2, the remote hall operating panel 5 is provided in the vicinity of the entrance 7 of the first floor of the building 6 and is formed from a security gate by use of which the passenger inputs security authentication information by holding his or her ID card thereto or performing fingerprint authentication. On the basis of the inputted security recognition information the remote hall operating panel 5 makes a determination as to whether or not the passenger should be allowed to enter the building 6, and in the case where entering the building is permitted, the remote hall operating panel 5 performs a remote hall registration and transmits the information on the remote hall call registration to the group supervisory controller 1. Here, "remote hall call" is a command issued to the group supervisory controller 1 to the effect that the car 33 is caused to be dispatched to the 1st floor where the remote hall operating panel 5 is provided (hereinafter referred to as the "remote-hall-operating-panel-installed floor"), and that after the passengers get on of the car, the car 33 is caused to run from the 1st floor upward.

Next, the configuration of the group supervisory controller 1 will be described. The group supervisory controller 1 is provided, for example, within the control panel of a machine room, and performs the group supervisory control of the elevators 3a to 3d on the basis of the information on hall call registrations, the information on car call registrations, the information on remote hall call registrations and the like. The group supervisory controller 1 has a storage section 11 which stores a program and the information and the like used in the execution of this program, and a control section 10, such as a central processing unit which executes the program stored in the storage section 11, which are connected to a bus 13. And this bus 13 is connected to the bus 2 via an I/F section 12.

Figure 4:
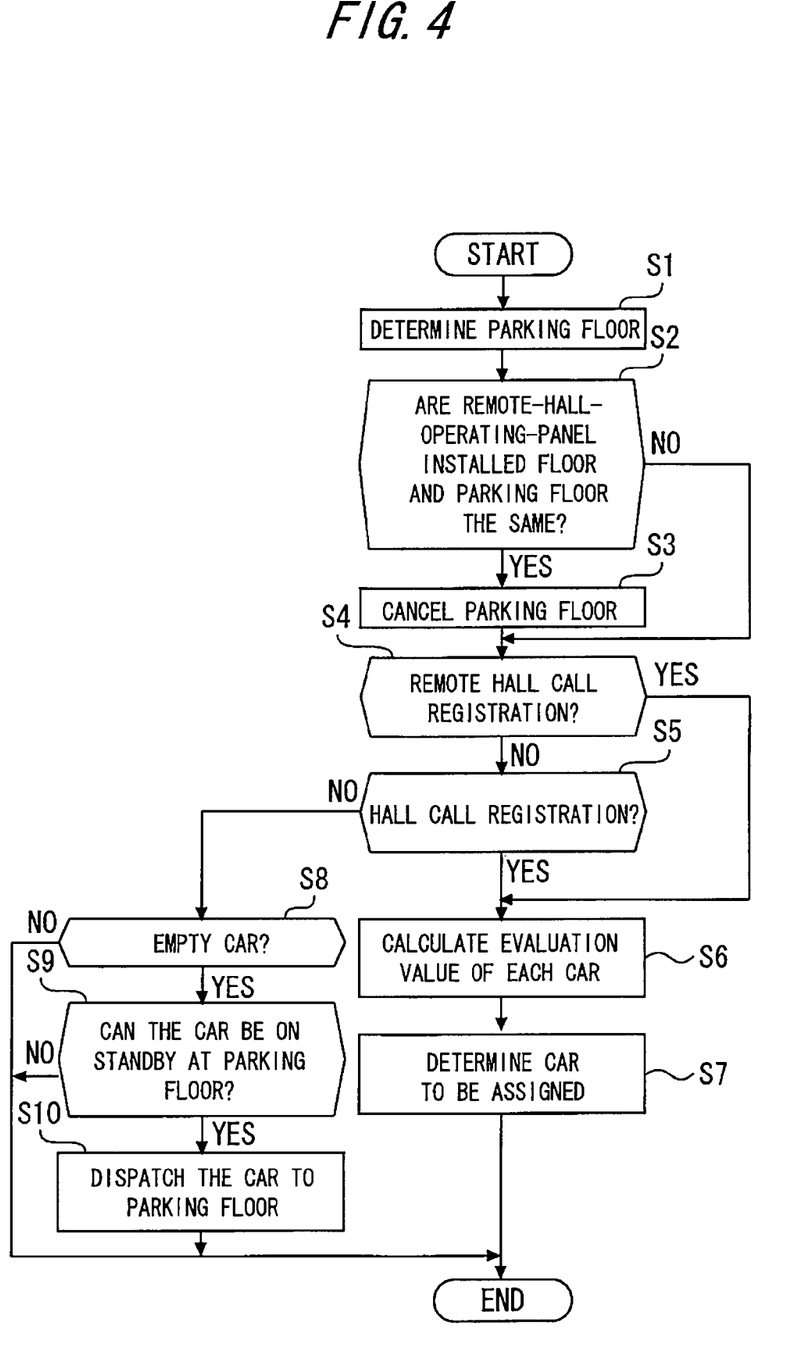
FIG. 4 is a flowchart showing the processing performed by the group supervisory controller 1 in Embodiment 1.

Next, referring to FIG. 4, a description will be given of the actions of the group supervisory controller in Embodiment 1. FIG. 4 is a flowchart showing the processing performed by the group supervisory controller 1 in Embodiment 1. Incidentally, the actions of the group supervisory controller 1 are performed in accordance with a program stored by the control section 10 of the group supervisory controller 1 in the storage section 11.

First, the group supervisory controller 1 beforehand stores the information on the remote-hall-operating-panel-installed floor which identifies the remote-hall-operating-panel-installed floor in the storage section 11. In this embodiment, the remote-hall-operating-panel-installed floor is the 1st floor.

And the group supervisory controller 1 stores the information on car call registrations, information on hall call registrations, and information on remote hall call registrations, which are received as required from the elevator controller 30, the hall button 4, and the remote hall operating panel 5, respectively, in the storage section 11 as learning data.

Next, on the basis of the learning data stored in the storage section 11 the group supervisory controller 1 periodically finds predicted demand values corresponding to each of the 1st to 10th floors, and stores the found predicted demand values in the storage section 11. The predicted demand value of each floor varies according to a day of the week and time zone. In addition, the predicted demand value of each floor is calculated on the basis of the probability of the occurrence of a hall call registration from that floor, the probability of the occurrence of a remote hall call registration from that floor, the probability of the occurrence of a car call registration with that floor serving as the destination floor, and so on. And when a floor has a high predicted demand value, this means that a large traffic volume is predicted for the floor. In the building 6, the floor having the highest predicted demand value is the entrance floor which is the 1st floor. The floor having the highest predicted demand value next to the 1st floor is the restaurant floor which is the 5th floor.

Next, on the basis of the predicted demand value of each floor stored in the storage section 11, the group supervisory controller 1 determines a parking floor, and stores the parking floor information which identifies the determined parking floor in the storage section 11 (Step S1). Here, "parking floor" is a floor at which a car 33 to which a hall call registration or a remote hall call registration has not been assigned and on which there is no passenger, i.e., an empty car is caused to be on standby until a hall call registration or a remote hall call registration is assigned. For example, a floor having the highest predicted demand value may sometimes be selected as a parking floor, and a floor intermediate between floors having two high predicted demand values may sometimes be selected as a parking floor. By setting a parking floor as a floor having a high predicted demand value or in the vicinity thereof, it is possible to quickly respond to many hall call registrations or remote hall call registrations and hence it is possible to shorten the time during which the passengers in the elevator hall of each floor wait as a whole. That is, it is possible to improve the operation efficiency of the whole group supervisory control system. Incidentally, as indicated by the dotted line of FIG. 3, within the building 6, in this step S1 the parking floor is set as the 1st floor having the highest predicted demand value.

Next, on the basis of the information on the remote-hall-operating-panel-installed floor and parking floor information stored in the storage section 11, the group supervisory controller 1 makes a determination as to whether or not the remote-hall-operating-panel-installed floor and the parking floor are the same (Step S2). That is, the group supervisory controller 1 makes a determination as to whether or not the parking floor is set as the 1st floor which is the remote-hall-operating-panel-installed floor. When it is determined in S2 that the remote-hall-operating-panel-installed floor and the parking floor are different, the flow of processing proceeds to S4.

On the other hand, when it is determined in S2 that the remote-hall-operating-panel-installed floor and the parking floor are the same, next, the group supervisory controller 1 cancels the parking floor (Step S3). That is, in FIG. 3, the remote-hall-operating-panel-installed floor and the parking floor are both the 1st floor and hence the group supervisory controller 1 cancels the parking floor, for example, by erasing the parking floor information from the storage section 11. As a result of this, the parking floor does not exist anymore.

Next, the group supervisory controller 1 makes a determination as to whether or not a new remote hall call registration has occurred on the remote hall operating panel 5 (Step S4). That is, the group supervisory controller 1 makes a determination as to whether or not the group supervisory controller 1 has received the information on a new remote hall call registration from the remote hall operating panel 5. When it is determined in S4 that a new remote hall call registration has occurred, the flow of processing proceeds to S6.

On the other hand, when it is determined in S4 that a new remote hall call registration did not occur, next, the group supervisory controller 1 makes a determination as to whether or not a new hall call registration has occurred by use of the hall button 4 (Step S5). That is, the group supervisory controller 1 makes a determination as to whether or not the group supervisory controller 1 has received the information on a new hall call registration from the hall button 4. When it is determined in S5 that a new hall call registration has occurred, the flow of processing proceeds to S6.

Next, in S6, on the basis of the new remote hall call registration which occurred in S4 or the new hall call registration which occurred in S5, the group supervisory controller 1 calculates an evaluation value of each car 33 and stores the calculated evaluation value of each car 33 in the storage section 11 (Step S6). Here, the "evaluation value" of each car 33 refers to a value calculated on the basis of the waiting time of passengers in each elevator hall expected when a new remote hall call registration or a hall call registration to the car 33 is assigned to the car 33, the total weight of the passengers present in the car 33, and the like. And when a car 33 has a high evaluation value, this means that it is difficult to assign a new remote hall call registration or a new hall call registration to this car 33.

Next, on the basis of the evaluation value of each car 33 stored in the storage section 11, the group supervisory controller 1 selects a car 33 having the lowest evaluation value, assigns the new remote hall call registration which has occurred in S4 or the hall call registration which has occurred in S5 to the selected car 33 (Step S7), and thereafter finishes the processing.

On the other hand, when it is determined in S5 that a new hall call registration did not occur, next, the group supervisory controller 1 makes a determination as to whether or not a car 33 to which a hall call registration or a remote hall call registration has not been assigned and on which there is no passenger exists, that is, an empty car exists (Step S8). When it is determined in S8 that an empty car does not exist, the processing is finished as it is.

On the other hand, when it is determined in S8 that an empty car exists, next, the group supervisory controller 1 makes a determination as to whether or not the car 33 which is an empty car is caused to be capable of being on standby at the parking floor (Step S9). Here, in the case where the parking floor was canceled in S3 and in the case where another car 33 is already on standby at the parking floor, it is impossible to cause this car 33 to be on standby at the parking floor. When it is determined in S9 that it is possible to cause the above-described car 33 to be capable of being on standby at the parking floor, next, the group supervisory controller 1 dispatches this car 33 to the parking floor (Step S10) and thereafter finishes the processing.

On the other hand, when in S9 it is impossible to cause the car 33 which is an empty car to be on standby at the parking floor, in order to cause this car 33 to perform an abandoned operation, at the stage where the last passenger gets out of the car, the processing is finished, with this car 3 kept on standby at the floor where the last passenger gets out of the car. Here, "abandoned operation" refers to an operation which involves causing the car 33 to which a hall call registration or a remote hall call registration has not been assigned and on which there is no passenger to be on standby at the floor where the last passenger gets out of the car until a hall call registration or a remote hall call registration is assigned. A plurality of cars 33 are prevented from being on standby at the parking floor like this, whereby it is impossible to cause the cars 33 to be on standby in a distributed manner with good efficiency.

Incidentally, the processing shown in FIG. 4 is periodically performed, and the steps S1 to S10 may be sequentially carried out or it is also possible to repeatedly carry out each step independently in cycles different from each other.

The remote hall operating panel 5 may also be installed within the building 6 in multiple numbers, may also be installed outside the building 6, and may also be installed on floors except the lowest floor. Moreover, the remote hall operating panel 5 is not limited to a security gate and may be composed of, for example, an upward button and a downward button for inputting the information on the destination floor direction. And the security authentication information may include destination floor information, and the information on remote hall call registrations may include destination floor information by providing a ten-key for inputting destination floor information to the remote hall operating panel 5.

The parking floor information stored in the storage section 11 in S1 may be set during the installation of the group supervisory control system.

According to Embodiment 1, in the case where the parking floor is set as the remote-hall-operating-panel-installed floor, it is possible to cancel the parking floor. As a result of this, during the movement of the passengers from the remote hall operating panel to an elevator hall, it is possible to prevent a car from being on standby at the remote-hall-operating-panel-installed floor. Consequently, the car to which a remote hall call registration has been assigned responds to the remote hall call registration after responding to, for example, other hall call registrations, and it is possible to effectively use the moving time of the passengers, with the result that it is possible to improve the operation efficiency of the whole group supervisory control system. Because an abandoned operation is performed, it is possible to reduce useless runs from the floor where the last passenger gets out of the car to the remote-hall-operating-panel-installed floor, and it is possible to reduce power consumption.

Although in S1 only one parking floor is determined, it is possible to determine a plurality of parking floors. For example, it is possible to adopt a method in which the floors of 1st floor to the 10th floor are divided into a plurality of zones and one parking floor is determined for each zone. As a result of this, it is possible to further improve the operation efficiency of the whole group supervisory control system.

Embodiment 2

Figure 5:
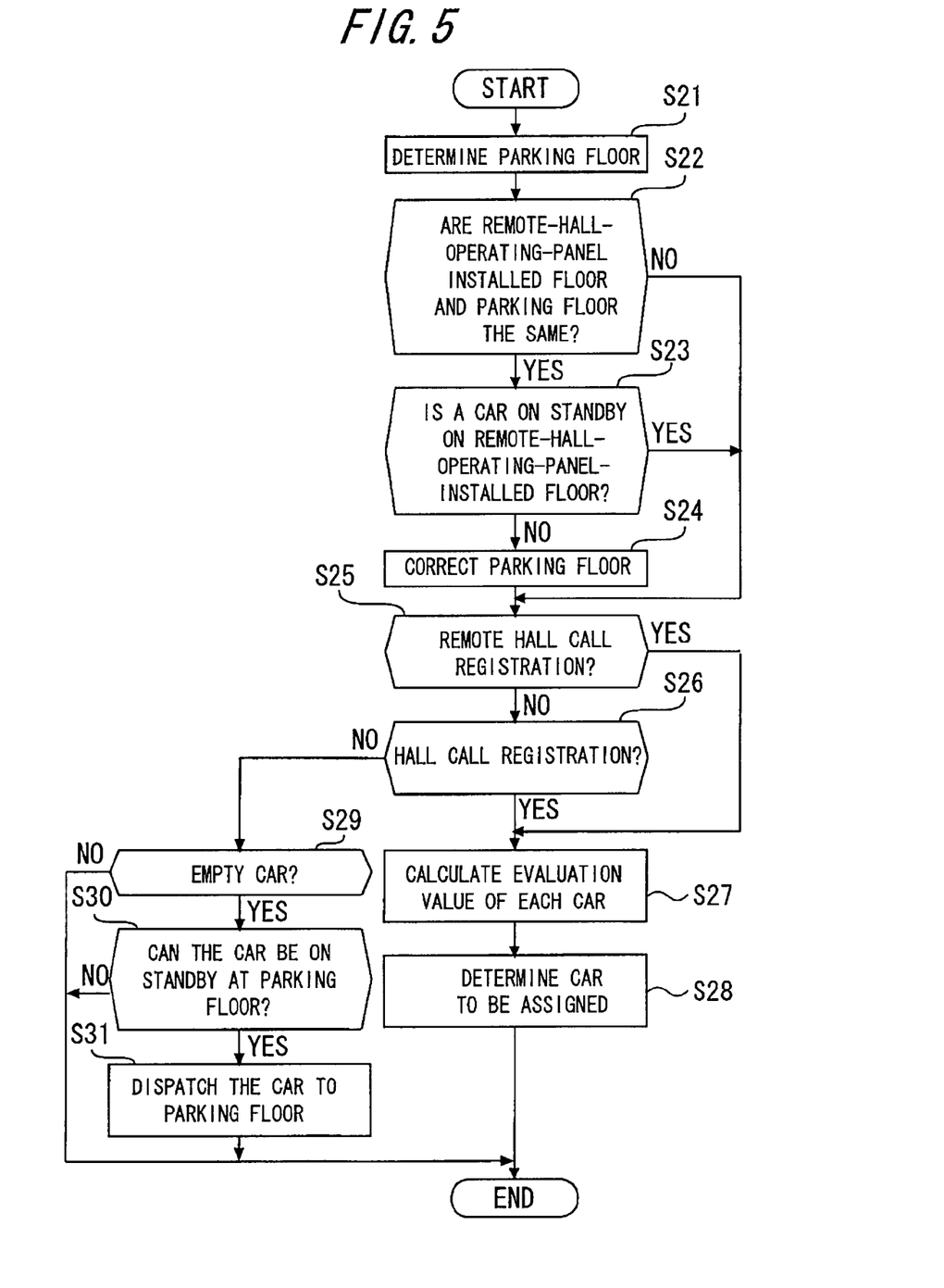
FIG. 5 is a flow chart showing the processing performed by the group supervisory controller 1 in Embodiment 2.

Referring to FIG. 5, Embodiment 2 of the present invention will be described.

First, the configuration of the group supervisory control system in Embodiment 2 is the same as shown in FIGS. 1 to 3 in Embodiment 1. Hereinafter the description will be given using the same symbols as used in Embodiment 1.

Next, referring to FIG. 5, a description will be given of the actions of the group supervisory controller in Embodiment 2. FIG. 5 is a flow chart showing the processing performed by the group supervisory controller 1 in Embodiment 2. Incidentally, the actions of the group supervisory controller 1 are performed in accordance with a program stored by the control section 10 of the group supervisory controller 1 in the storage section 11.

First, as with Embodiment 1, the group supervisory controller 1 beforehand stores the information on the remote-hall-operating-panel-installed floor which identifies the remote-hall-operating-panel-installed floor in the storage section 11. In this embodiment, the remote-hall-operating-panel-installed floor is the 1st floor.

And the group supervisory controller 1 beforehand stores moving time values which determine an average value of moving time which is required by each passenger in moving from the remote hall operating panel 5 to an elevator hall in the storage section 11. This moving time value may be a value set during the installation of the group supervisory control system or may be a value periodically calculated by the control section 10 on the basis of the distance between the remote hall operating panel 5 and the elevator hall and an average value of the moving speed of each passenger, and the like.

And as with Embodiment 1, the group supervisory controller 1 stores the information on car call registrations, information on hall call registrations, and information on remote hall call registrations, which are received as required from the elevator controller 30, the hall button 4, and the remote hall operating panel 5, respectively, in the storage section 11 as learning data.

Next, as with Embodiment 1, on the basis of the learning data stored in the storage section 11 the group supervisory controller 1 periodically finds predicted demand values corresponding to each of the 1st to 10th floors, and stores the found predicted demand values in the storage section 11. The predicted demand value of each floor varies according to a day of the week and time zone. In addition, the predicted demand value of each floor is calculated on the basis of the probability of the occurrence of a hall call registration from that floor, the probability of the occurrence of a remote hall call registration from that floor, the probability of the occurrence of a car call registration, with that floor serving as the destination floor, and so on. And when a floor has a high predicted demand value, this means that a large traffic volume is predicted for the floor. In the building 6, the floor having the highest predicted demand value is the entrance floor which is the 1st floor. The floor having the highest predicted demand value next to the 1st floor is the restaurant floor which is the 5th floor.

Next, on the basis of the predicted demand value of each floor stored in the storage section 11, the group supervisory controller 1 determines a parking floor, and stores the parking floor information which identifies the determined parking floor in the storage section 11 (Step S21). In this building 6, the parking floor is set as the 1st floor having the highest predicted demand value. Incidentally, this step S21 is the same as S1 in Embodiment 1.

Next, on the basis of the information on the remote-hall-operating-panel-installed floor and parking floor information stored in the storage section 11, the group supervisory controller 1 makes a determination as to whether or not the remote-hall-operating-panel-installed floor and the parking floor are the same (Step S22). That is, the group supervisory controller 1 makes a determination as to whether or not the parking floor is set as the 1st floor which is the remote-hall-operating-panel-installed floor. Incidentally, this step S22 is the same as S2 in Embodiment 1. When it is determined in S22 that the remote-hall-operating-panel-installed floor and the parking floor are different, the flow of processing proceeds to S25.

On the other hand, when it is determined in S22 that the remote-hall-operating-panel-installed floor and the parking floor are the same, next, the group supervisory controller 1 makes a determination as to whether or not a car 33 is on standby at the remote-hall-operating-panel-installed floor (Step S23). When it is determined in S23 that the car 33 is on standby at the remote-hall-operating-panel-installed floor, the flow of processing proceeds to S25.

On the other hand, when it is determined in S23 that the car 33 is not on standby at the remote-hall-operating-panel-installed floor, next, on the basis of the moving time value and predicted demand value of each floor stored in the storage section 11, the group supervisory controller 1 corrects the parking floor set as the remote-hall-operating-panel-installed floor, and stores the parking floor information which identifies a parking floor after the correction (hereinafter referred to as the "corrected parking floor") (Step S24). That is, the group supervisory controller 1 temporarily cancels the parking floor, for example, by erasing the parking floor information from the storage section 11, determines a floor which enables the car 33 to be dispatched to the remote-hall-operating-panel-installed floor within the moving time and is nearest to the floor having the highest predicted demand value next to the remote-hall-operating-panel-installed floor as the parking floor, and stores the parking floor information which identifies the determined parking floor.

For example, in the building 6, the moving time is 20 seconds and it takes 8 seconds to dispatch the car 33 to the next floor. Consequently, floors which enable the car 33 to be dispatched to the remote-hall-operating-panel-installed floor within the moving time are the 2nd floor and the 3rd floor. The floor having the highest predicted demand value next to the remote-hall-operating-panel-installed floor is the 5th floor as described above. Therefore, in S24 the 3rd floor is determined as the corrected parking floor.

Incidentally, in the case where in S23 the car 33 is already on standby at the remote-hall-operating-panel-installed floor, it is ensured that the time is not taken to correct the parking floor, whereby useless power consumption is prevented.

Next, the steps S25 to S31 are the same as S4 to S10, respectively, in Embodiment 1 and the descriptions thereof are omitted.

Incidentally, the processing shown in FIG. 5 is periodically performed, and the steps S21 to S31 may be sequentially carried out or it is also possible to repeatedly carry out each step independently in cycles different from each other.

The remote hall operating panel 5 may also be installed within the building 6 in multiple numbers, may also be installed outside the building 6, and may also be installed on floors except the lowest floor. Moreover, the remote hall operating panel 5 is not limited to a security gate and may be composed of, for example, an upward button and a downward button for inputting the information on the destination floor direction. And the security authentication information may include destination floor information, and the information on remote hall call registrations may include destination floor information by providing a ten-key for inputting destination floor information to the remote hall operating panel 5.

The parking floor information stored in the storage section 11 in S21 may be set during the installation of the group supervisory control system.

According to Embodiment 2, in the case where the parking floor is set as the remote-hall-operating-panel-installed floor, it is possible to correct the parking floor and determine a floor which enables the car to be dispatched to the remote-hall-operating-panel-installed floor within the moving time and is nearest to the floor having the highest predicted demand value next to the remote-hall-operating-panel-installed floor as the parking floor. As a result of this, in addition to the effect of Embodiment 1, the time during which a passenger who has registered a remote hall call waits in the elevator hall on the remote-hall-operating-panel-installed floor can be made zero. In addition, because a floor having the highest predicted demand value next to the remote-hall-operating-panel-installed floor or a floor close thereto is selected as the parking floor, it is possible to quickly respond to more hall calls and it is possible to reduce power consumption.

For example, in S24 the 3rd floor is selected as the corrected parking floor, whereby the running distance between the corrected parking floor and the 5th floor becomes short compared to the case where the corrected parking floor is the 2nd floor and hence it is possible to quickly respond to hall call registrations occurring from the 5th floor.

Although in S21 only one parking floor is determined, it is possible to determine a plurality of parking floors. For example, it is possible to adopt a method in which the floors of the 1st floor to 10th floor are divided into a plurality of zones and one parking floor is determined for each zone. As a result of this, it is possible to further improve the operation efficiency of the whole group supervisory control system.

Embodiment 3

Figure 6:
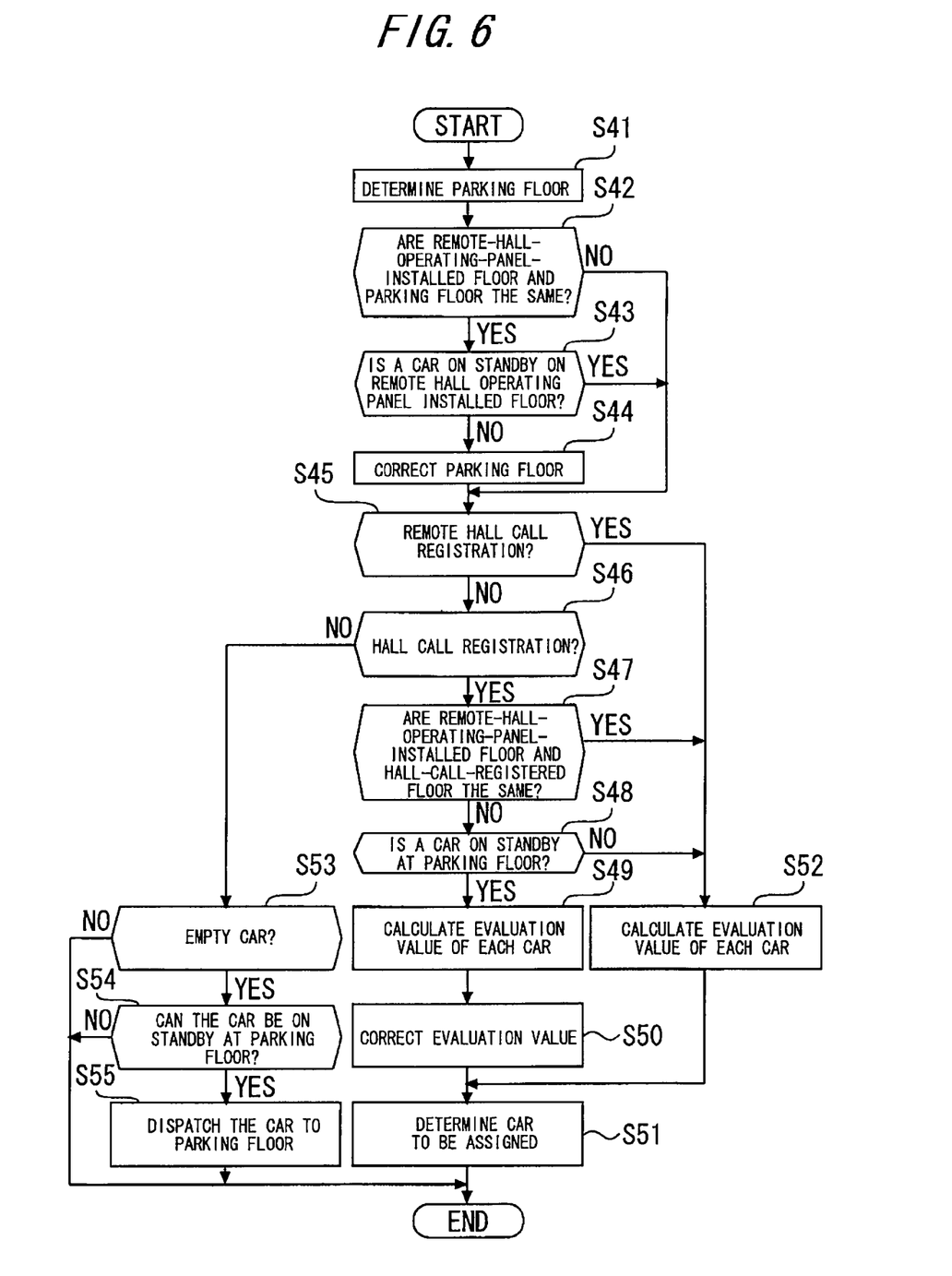
FIG. 6 is a flowchart showing the processing performed by the group supervisory controller 1 in Embodiment 3.

Referring to FIG. 6, Embodiment 3 of the present invention will be described.

First, the configuration of the group supervisory control system in Embodiment 3 is the same as shown in FIGS. 1 to 3 in Embodiment 1. Hereinafter the description will be given using the same symbols as used in Embodiment 1.

Next, referring to FIG. 6, a description will be given of the actions of the group supervisory controller in Embodiment 3. FIG. 6 is a flowchart showing the processing performed by the group supervisory controller 1 in Embodiment 3. Incidentally, the actions of the group supervisory controller 1 are performed in accordance with a program stored by the control section 10 of the group supervisory controller 1 in the storage section 11.

First, as with Embodiment 1, the group supervisory controller 1 beforehand stores the information on the remote-hall-operating-panel-installed floor which identifies the remote-hall-operating-panel-installed floor in the storage section 11. In this embodiment, the remote-hall-operating-panel-installed floor is the 1st floor.

And as with Embodiment 2, the group supervisory control system 1 beforehand stores moving time values which determine an average value of moving time which is required by each passenger in moving from the remote hall operating panel 5 to an elevator hall in the storage section 11. This moving time value may be a value set during the installation of the group supervisory control system or may be a value periodically calculated by the control section 10 on the basis of the distance between the remote hall operating panel 5 and the elevator hall and an average value of the moving speed of each passenger, and the like.

And as with Embodiment 1, the group supervisory controller 1 stores the information on car call registrations, information on hall call registrations, and information on remote hall call registrations, which are received as required from the elevator controller 30, the hall button 4, and the remote hall operating panel 5, respectively, in the storage section 11 as learning data.

Next, as with Embodiment 1, on the basis of the learning data stored in the storage section 11 the group supervisory controller 1 periodically finds predicted demand values corresponding to each of the 1st to 10th floors, and stores the found predicted demand values in the storage section 11. The predicted demand value of each floor varies according to a day of the week and time zone. In addition, the predicted demand value of each floor is calculated on the basis of the probability of the occurrence of a hall call registration from that floor, the probability of the occurrence of a remote hall call registration from that floor, the probability of the occurrence of a car call registration, with that floor serving as the destination floor, and so on. And when a floor has a high predicted demand value, this means that a large traffic volume is predicted for the floor. In the building 6, the floor having the highest predicted demand value is the entrance floor which is the 1st floor. The floor having the highest predicted demand value next to the 1st floor is the restaurant floor which is the 5th floor.

Next, the steps S41 to S44 are the same as S21 to S24, respectively, in Embodiment 2 and the descriptions thereof are omitted.

Next, the group supervisory controller 1 makes a determination as to whether or not a new remote hall call registration has occurred on the remote hall operating panel 5 (Step S45). That is, the group supervisory controller 1 makes a determination as to whether or not the group supervisory controller 1 has received the information on a new remote hall call registration from the remote hall operating panel 5. Incidentally, this Step 45 is the same as S4 in Embodiment 1. When it is determined in S45 that a new remote hall call registration has occurred, the flow of processing proceeds to S52.

On the other hand, when it is determined in S45 that a new remote hall call registration did not occur, next, the group supervisory controller 1 makes a determination as to whether or not a new hall call registration has occurred by use of the hall button 4 (Step S46). That is, the group supervisory controller 1 makes a determination as to whether or not the group supervisory controller 1 has received the information on a new hall call registration from the hall button 4. Incidentally, this Step 46 is the same as S5 in Embodiment 1. When it is determined in S46 that a new hall call registration did not occur, the flow of processing proceeds to S53.

On the other hand, when it is determined in S46 that a new remote hall call registration has occurred, on the basis of the information on the remote-hall-operating-panel-installed floor stored in the storage section 11, the group supervisory controller 1 makes a determination as to whether or not the remote-hall-operating-panel-installed floor and the hall-call-registered floor for which this new hall call has been registered are the same (Step S47). When it is determined in S47 that the remote-hall-operating-panel-installed floor and the hall-call-registered floor are the same, the flow of processing proceeds to S52.

On the other hand, when it is determined in S47 that the remote-hall-operating-panel-installed floor and the hall-call-registered floor are different, next, on the basis of the parking floor information stored in the storage section 11, the group supervisory controller 1 makes a determination as to whether or not the car 33 is on standby at the parking floor (Step S48). When it is determined in S48 that no car 33 is on standby at the parking floor, the flow of processing proceeds to S52.

On the other hand, it is determined in S48 that a car 33 is on standby at the parking floor, on the basis of the new hall call registration which occurred in S46, the group supervisory controller 1 calculates an evaluation value of each car 33, and stores the calculated evaluation value in the storage section 11 (Step S49). Incidentally, this step S49 is the same as S6 in Embodiment 1.

Next, the group supervisory controller 1 corrects the evaluation value of the car 33 which is on standby at the parking floor, and stores the evaluation value after the correction in the storage section (Step S50). That is, the group supervisory controller 1 sets the evaluation value of the car 33 which is on standby at the parking floor high to a prescribed value and stores the set evaluation value in the storage section 11. As a result of this, it is difficult to assign the new hall call registration which occurred in S46 to the car 33 which is on standby at the parking floor. Here "prescribed value" refers, for example, to an average value of time during which the passengers wait at the elevator hall.

Next, on the basis of the evaluation value of each car 33 stored in the storage section 11, the group supervisory controller 1 selects a car 33 having the lowest evaluation value, assigns the new hall call registration which occurred in S46 to the selected car 33 (S51), and thereafter finishes the processing. Incidentally, this step S51 is the same as S7 in Embodiment 1.

On the other hand, in S52, on the basis of the new remote hall call registration which occurred in S45 or the new hall call registration which occurred in S46, the group supervisory controller 1 calculates an evaluation value of each car 33, and stores the calculated evaluation value in the storage section 11 (Step S52). Incidentally, this step S52 is the same as S6 in Embodiment 1. Thereafter, the flow of processing proceeds to S51.

On the other hand, the steps S53 to S55 are the same as S8 to S10 in Embodiment 1 and the descriptions thereof are omitted.

Incidentally, the processing shown in FIG. 6 is periodically performed, and the steps S41 to S55 may be sequentially carried out or it is also possible to carry out each step independently.

The remote hall operating panel 5 may also be installed within the building 6 in multiple numbers, may also be installed outside the building 6, and may also be installed on floors except the lowest floor. Moreover, the remote hall operating panel 5 is not limited to a security gate and may be composed of, for example, an upward button and a downward button for inputting the information on the destination floor direction. And the security authentication information may include destination floor information, and the information on remote hall calls registration may include destination floor information by providing a ten-key for inputting destination floor information to the remote hall operating panel 5.

The parking floor information stored in the storage section 11 in S41 may be set during the installation of the group supervisory control system.

According to Embodiment 3, in addition to the effect of Embodiment 2, it is possible to limit assigning a hall call registration occurring from a floor except the remote-hall-operating-panel-installed floor to a car which is on standby at the parking floor set as a floor except the remote-hall-operating-panel-installed floor. As a result of this, it is possible to substantially preferentially assign a remote hall call registration and a hall call registration which occur from the remote-hall-operating-panel-installed floor to a car which is on standby at the parking floor.

For example, in the case where the parking floor is set as the 3rd floor, assigning a hall call registration occurring from the 2nd floor to the 10th floor, which are floors except the remote-hall-operating-panel-installed floor, to a car on standby at the parking floor, is limited. As a result of this, a remote hall call registration and a hall call registration which occur from the 1st floor, which is the remote-hall-operating-panel-installed floor, are substantially preferentially assigned to a car which is on standby at the parking floor.

Although in S41 only one parking floor is determined, it is possible to determine a plurality of parking floors. For example, it is possible to adopt a method in which the floors of the 1st floor to 10th floor are divided into a plurality of zones and one parking floor is determined for each zone. As a result of this, it is possible to further improve the operation efficiency of the whole group supervisory control system.

Embodiment 4

Figure 7:
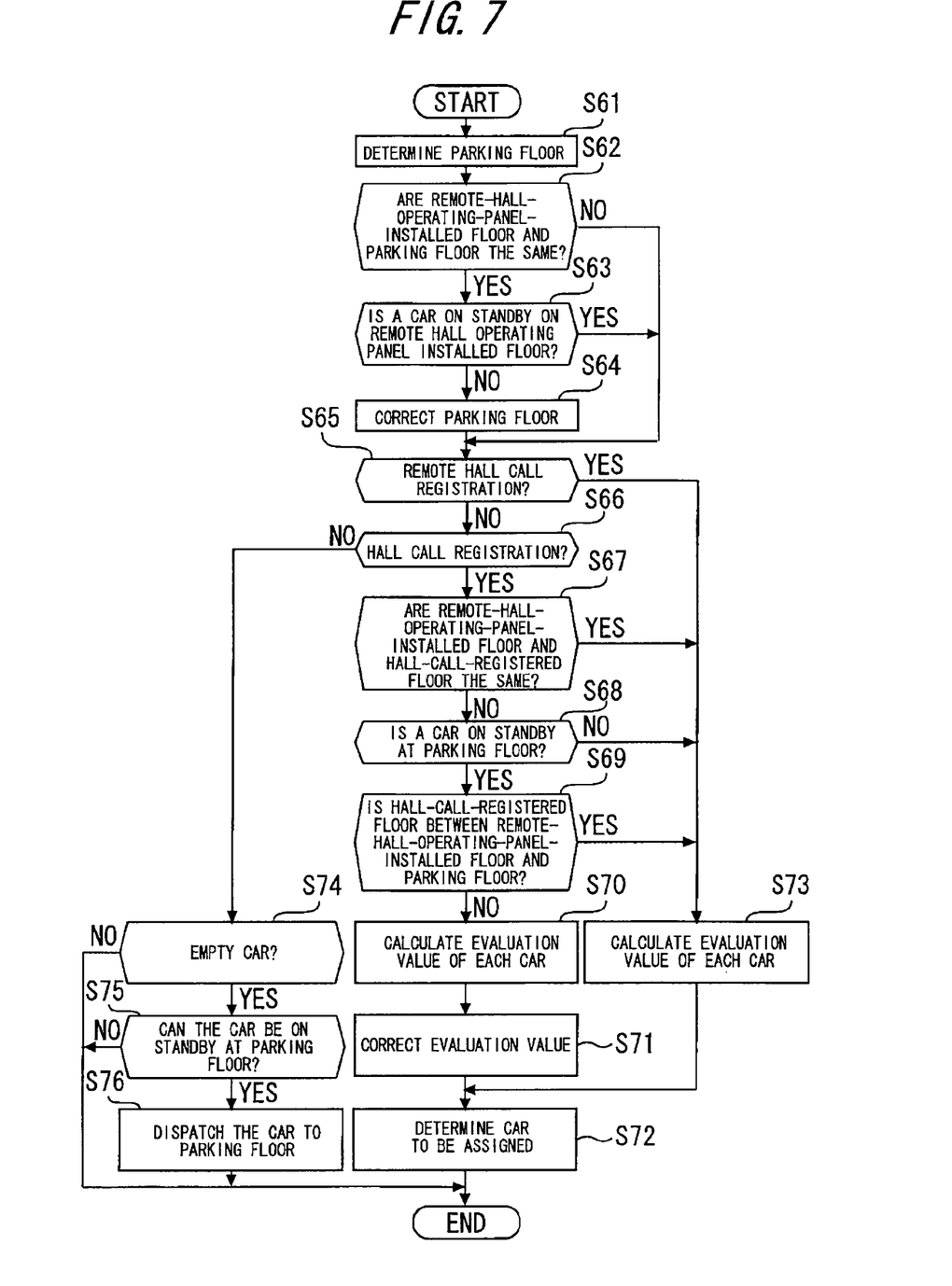
FIG. 7 is a flowchart showing the processing performed by the group supervisory controller 1 in Embodiment 4.

Referring to FIG. 7, Embodiment 4 of the present invention will be described.

First, the configuration of the group supervisory control system in Embodiment 4 is the same as shown in FIGS. 1 to 3 in Embodiment 1. Hereinafter the description will be given using the same symbols as used in Embodiment 1.

Next, referring to FIG. 7, a description will be given of the actions of the group supervisory controller in Embodiment 4. FIG. 7 is a flowchart showing the processing performed by the group supervisory controller 1 in Embodiment 4. Incidentally, the actions of the group supervisory controller 1 are performed in accordance with a program stored by the control section 10 of the group supervisory controller 1 in the storage section 11.

First, as with Embodiment 1, the group supervisory controller 1 beforehand stores the information on the remote-hall-operating-panel-installed floor which identifies the remote-hall-operating-panel-installed floor in the storage section 11. In this embodiment, the remote-hall-operating-panel-installed floor is the 1st floor.

And as with Embodiment 2, the group supervisory control system 1 beforehand stores moving time values which determine an average value of moving time which is required by each passenger in moving from the remote hall operating panel 5 to an elevator hall in the storage section 11. This moving time value may be a value set during the installation of the group supervisory control system or may be a value periodically calculated by the control section 10 on the basis of the distance between the remote hall operating panel 5 and the elevator hall and the average moving speed of each passenger, and the like.

And as with Embodiment 1, the group supervisory controller 1 stores the information on car call registrations, information on hall call registrations, and information on remote hall call registrations, which are received as required from the elevator controller 30, the hall button 4, and the remote hall operating panel 5, respectively, in the storage section 11 as learning data.

Next, as with Embodiment 1, on the basis of the learning data stored in the storage section 11 the group supervisory controller 1 periodically finds predicted demand values corresponding to each of the 1st to 10th floors, and stores the found predicted demand values in the storage section 11. The predicted demand value of each floor varies according to a day of the week and time zone. In addition, the predicted demand value of each floor is calculated on the basis of the probability of the occurrence of a hall call registration from that floor, the probability of the occurrence of a remote hall call registration from that floor, the probability of the occurrence of a car call registration, with that floor serving as the destination floor, and so on. And when a floor has a high predicted demand value, this means that a large traffic volume is predicted for the floor. In the building 6, the floor having the highest predicted demand value is the entrance floor which is the 1st floor. The floor having the highest predicted demand value next to the 1st floor is the restaurant floor which is the 5th floor.

Next, the steps S61 to S68 are the same as S41 to S48, respectively, in Embodiment 3 and the descriptions thereof are omitted.

Next, the group supervisory controller 1 makes a determination as to whether or not the hall-call-registered floor of the new hall call registration which occurred in S66 is situated between the remote hall operating panel and the parking floor (Step S69). When it is determined in S69 that the hall-call-registered floor of the new hall call registration which occurred in S66 is situated between the remote hall operating panel and the parking floor, the flow of processing proceeds to S73.

On the other hand, when it is determined in S69 that the hall-call-registered floor of the new hall call registration which occurred in S66 is not situated between the remote hall operating panel and the parking floor, the flow of processing proceeds to S70.

Next, the steps S71 to S76 are the same as S50 to S55, respectively, in Embodiment 3 and the descriptions thereof are omitted.

Incidentally, the processing shown in FIG. 7 is periodically performed, and the steps S61 to S76 may be sequentially carried out or it is also possible to carry out each step independently.

The remote hall operating panel 5 may also be installed within the building 6 in multiple numbers, may also be installed outside the building 6, and may also be installed on floors except the lowest floor. Moreover, the remote hall operating panel 5 is not limited to a security gate and may be composed of, for example, an upward button and a downward button for inputting the information on the destination floor direction. And the security authentication information may include destination floor information, and the information on remote hall call registrations may include destination floor information by providing a ten-key for inputting destination floor information to the remote hall operating panel 5.

The parking floor information stored in the storage section 11 in S61 may be set during the installation of the group supervisory control system.

According to Embodiment 4, it is possible to limit assigning a hall call registration occurring from a floor not situated between the remote-hall-operating-panel-installed floor and the parking floor to a car on standby at the parking floor set as a floor except the remote-hall-operating-panel-installed floor. As a result of this, it is possible to prevent the car on standby at the parking floor from running in the direction in which the car moves away from the remote-hall-operating-panel-installed floor, and from being dispatched to the hall-call-registered floor. In addition, because it is possible to assign a hall call occurring from a floor situated between the remote-hall-operating-panel-installed floor and the parking floor to a car on standby at the parking floor, it is possible to respond to many hall calls compared to Embodiment 3.

For example, in the case where the parking floor is set as the 3rd floor, limited is assigning a hall call registration occurring from the 4th floor to the 10th floor, which are floors not situated between the remote hall operating panel and the parking floor, to a car on standby at the parking floor. As a result of this, a remote hall call registration and a hall call registration occurring from the 1st floor, which is the remote-hall-operating-panel-installed floor, to a hall-call-registered floor as well as a hall call registration occurring from the 2nd floor and the 3rd floor are substantially preferentially assigned to a car on standby at the parking floor.

Although in S61 only one parking floor is determined, it is possible to determine a plurality of parking floors. For example, it is possible to adopt a method in which the floors of the 1st floor to 10th floor are divided into a plurality of zones and one parking floor is determined for each zone. As a result of this, it is possible to further improve the operation efficiency of the whole group supervisory control system.

Embodiment 5

Figure 8:
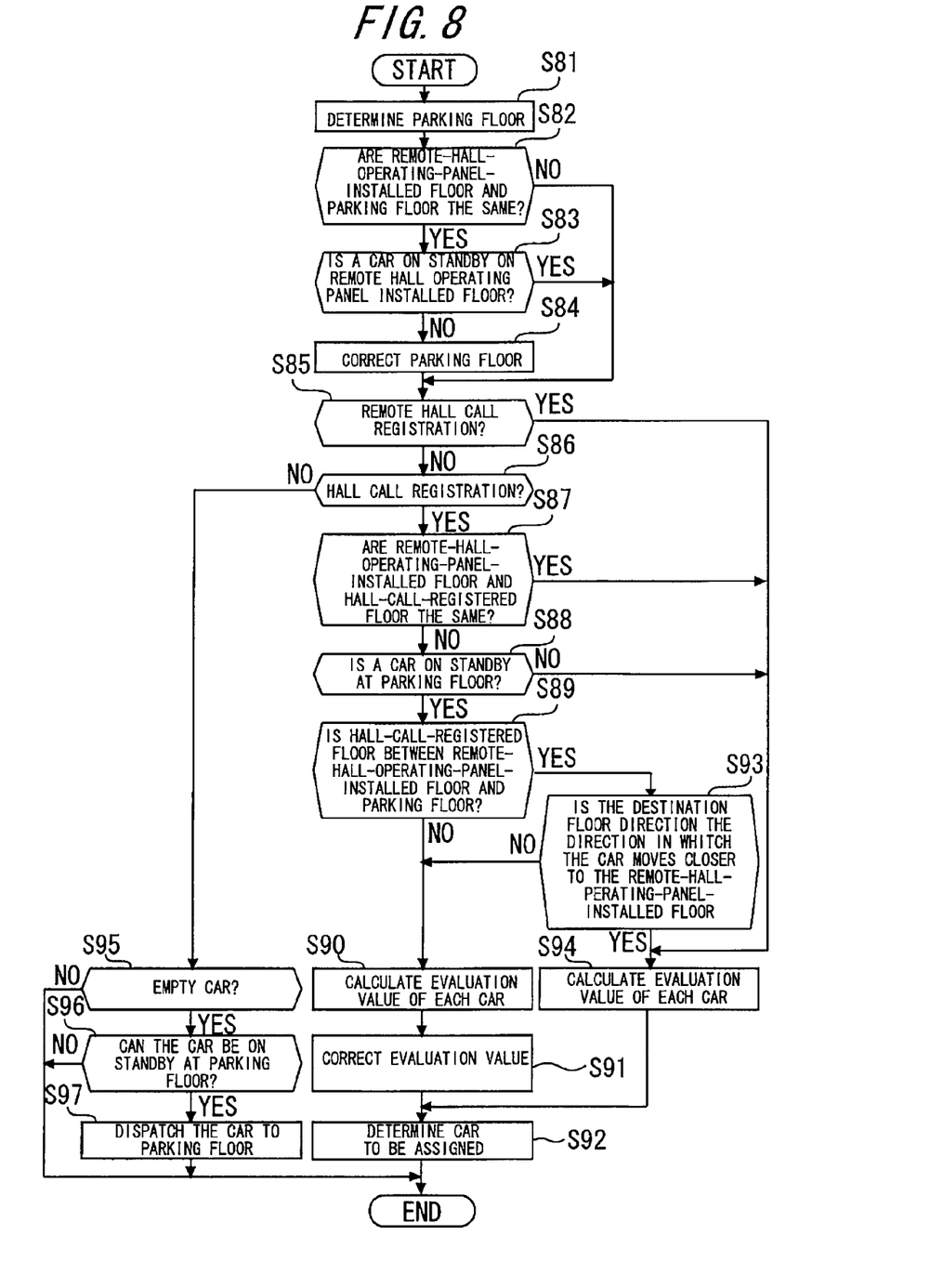
FIG. 8 is a flowchart showing the processing performed by the group supervisory controller 1 in Embodiment 5.

Referring to FIG. 8, Embodiment 5 of the present invention will be described.

First, the configuration of the group supervisory control system in Embodiment 5 is the same as shown in FIGS. 1 to 3 in Embodiment 1. Hereinafter the description will be given using the same symbols as used in Embodiment 1.

Next, referring to FIG. 8, a description will be given of the actions of the group supervisory controller in Embodiment 5. FIG. 8 is a flowchart showing the processing performed by the group supervisory controller 1 in Embodiment 5. Incidentally, the actions of the group supervisory controller 1 are performed in accordance with a program stored by the control section 10 of the group supervisory controller 1 in the storage section 11.

First, as with Embodiment 1, the group supervisory controller 1 beforehand stores the information on the remote-hall-operating-panel-installed floor which identifies the remote-hall-operating-panel-installed floor in the storage section 11. In this embodiment, the remote-hall-operating-panel-installed floor is the 1st floor.

And as with Embodiment 2, the group supervisory controller 1 beforehand stores moving time values which determine an average value of moving time which is required by each passenger in moving from the remote hall operating panel 5 to an elevator hall in the storage section 11. This moving time value may be a value set during the installation of the group supervisory control system or may be a value periodically calculated by the control section 10 on the basis of the distance between the remote hall operating panel 5 and the elevator hall and the average moving speed of each passenger, and the like.

And as with Embodiment 1, the group supervisory controller 1 stores the information on car call registrations, information on hall call registrations, and information on remote hall call registrations, which are received as required from the elevator controller 30, the hall button 4, and the remote hall operating panel 5, respectively, in the storage section 11 as learning data.

Next, as with Embodiment 1, on the basis of the learning data stored in the storage section 11 the group supervisory controller 1 periodically finds predicted demand values corresponding to each of the 1st to 10th floors, and stores the found predicted demand values in the storage section 11. The predicted demand value of each floor varies according to a day of the week and time zone. In addition, the predicted demand value of each floor is calculated on the basis of the probability of the occurrence of a hall call registration from that floor, the probability of the occurrence of a remote hall call registration from that floor, the probability of the occurrence of a car call registration, with that floor serving as the destination floor, and so on. And when a floor has a high predicted demand value, this means that a large traffic volume is predicted for the floor. In the building 6, the floor having the highest predicted demand value is the entrance floor which is the 1st floor. The floor having the highest predicted demand value next to the 1st floor is the restaurant floor which is the 5th floor.

Next, the steps S81 to S88 are the same as S41 to S48, respectively, in Embodiment 3 and the descriptions thereof are omitted.

Next, the group supervisory controller 1 makes a determination as to whether or not the hall-call-registered floor of the new hall call registration which occurred in S86 is situated between the remote hall operating panel and the parking floor (Step S89). Incidentally, this step S89 is the same as S69 in Embodiment 4. When it is determined in S89 that the hall-call-registered floor of the new hall call registration which occurred in S86 is situated between the remote hall operating panel and the parking floor, the flow of processing proceeds to S93.

On the other hand, when it is determined in S89 that the hall-call-registered floor of the new hall call registration which occurred in S86 is not situated between the remote hall operating panel and the parking floor, the flow of processing proceeds to S90.

Next, the steps S90 to S92 are the same as S49 to S51, respectively, in Embodiment 3 and the descriptions thereof are omitted.

On the other hand, in S93, the group supervisory controller 1 makes a determination as to whether or not the destination floor direction of the new hall call registration which occurred in S86 is the direction in which the car moves closer to the remote-hall-operating-panel-installed floor as viewed from the parking floor (Step S93). When it is determined in S93 that the destination floor direction is the direction in which the car moves closer to the remote-hall-operating-panel-installed floor, the flow of processing proceeds to S94.

When it is determined in S93 that the destination floor direction of the new hall call registration which occurred in S86 is the direction in which the car moves away from the remote-hall-operating-panel-installed floor, the flow of processing proceeds to S90. Next, the steps S94 to S97 are the same as S52 to S55, respectively, in Embodiment 3 and the descriptions thereof are omitted.

Incidentally, the processing shown in FIG. 8 is periodically performed, and the steps S81 to S97 may be sequentially carried out or it is also possible to carry out each step independently.

The remote hall operating panel 5 may also be installed within the building 6 in multiple numbers, may also be installed outside the building 6, and may also be installed on floors except the lowest floor. Moreover, the remote hall operating panel 5 is not limited to a security gate and may be composed of, for example, an upward button and a downward button for inputting the information on the destination floor direction. And the security authentication information may include destination floor information, and the information on remote hall call registrations may include destination floor information by providing a ten-key for inputting destination floor information to the remote hall operating panel 5.

The parking floor information stored in the storage section 11 in S81 may be set during the installation of the group supervisory control system.

According to Embodiment 5, it is possible to limit assigning a hall call registration occurring from floors except the remote-hall-operating-panel-installed floor and a hall call registration which occurs from a floor situated between the remote-hall-operating-panel-installed floor and the parking floor and in which the destination floor direction is the direction in which the car moves away from the remote-hall-operating-panel-installed floor to a car on standby at the parking floor set as a floor except the remote-hall-operating-panel-installed floor. As a result of this, it is possible to prevent the car on standby at the parking floor from running in the direction in which the car moves away from the remote-hall-operating-panel-installed floor, and from being dispatched to the hall-call-registered floor or the destination floor. Consequently, compared to the effect of Embodiment 4, it is possible to improve the operation efficiency of the whole group supervisory control system.

For example, in the case where the parking floor is set as the 3rd floor, limited is assigning a hall call registration occurring from the 4th floor to the 10th floor, which are floors not situated between the remote-hall-operating-panel-installed floor and the parking floor, as well as an upward hall call registration which occurs from the 2nd to the 3rd floor situated between the remote-hall-operating-panel-installed floor and the parking floor and in which the destination floor direction is the direction in which the car moves away from the remote-hall-operating-panel-installed floor to a car on standby at the parking floor. As a result of this, a remote hall call registration or a hall call registration occurring from the 1st floor, which is the remote-hall-operating-panel-installed floor, to a hall-call-registered floor as well as a downward hall call registration occurring from the 2nd floor and the 3rd floor are substantially preferentially assigned to a car on standby at the parking floor.

Although in S81 only one parking floor is determined, it is possible to determine a plurality of parking floors. For example, it is possible to adopt a method in which the floors of the 1st floor to 10th floor are divided into a plurality of zones and one parking floor is determined for each zone. As a result of this, it is possible to further improve the operation efficiency of the whole group supervisory control system.

Incidentally, the hall button 4 corresponds to the hall call means, and the remote hall operating panel 5 corresponds to the remote hall call means. The step S1 of FIG. 4 corresponds to the parking floor determination means and the parking floor determination step, the step S2 of FIG. 4 corresponds to the comparison means, and the step S3 of FIG. 4 corresponds to the parking floor cancel means and the parking floor cancel step. And the step S24 of FIG. 5 corresponds to the parking floor correction means and the parking floor correction step. In addition, the steps S48 to S52 of FIG. 6, the steps S68 to S73 of FIG. 7, and the steps S88 to S94 of FIG. 8 correspond to the car assignment limiting means and the parking floor limiting step.

The invention claimed is:

1. An elevator group supervisory control system comprising:
    a hall call device which is provided in an elevator hall and performs registration of a hall call;
    a remote hall call device which is provided in a remote-hall-call-device-installed floor at a place away from the elevator hall and performs registration of a hall call;
    parking floor determination means which determines a first parking floor intended for causing an empty car to be on standby, based on a predicted demand value for the empty car;
    comparison means which determines whether the first parking floor determined by the parking floor determination means and the remote-hall-call-device-installed floor are the same floor; and
    parking floor cancel means which cancels the first parking floor when the comparison means determines that the first parking floor determined by the parking floor determination means and the remote-hall-call-device-installed floor are the same floor.

2. The elevator group supervisory control system according to claim 1, further comprising:
    parking floor correction means which determines a second parking floor which is different from the remote-hall-call-device-installed floor and is intended for causing an empty car to be on standby when the parking floor cancel means has canceled the first parking floor.

3. The elevator group supervisory control system according to claim 2, wherein the parking floor correction means determines the second parking floor on the basis of the moving time which is required by a passenger in moving from the place where the remote hall call device is provided to the elevator hall on the remote-hall-call-device-installed floor.

4. The elevator group supervisory control system according to claim 2, further comprising car assignment limiting means which limits assigning a prescribed call registration by the hall call device to an empty car when the empty car is on standby at the second parking floor.

5. An elevator group supervisory control method, comprising:
    a parking floor determination step for determining a first parking floor intended for causing an empty car to be on standby, based on a predicted demand value for the empty car;
    a comparison step for determining whether the first parking floor and a remote-hall-call-device-installed floor, on which remote-hall-call-device-installed floor a remote hall call device is provided at a place away from the elevator hall and performs registration of a hall call, are the same floor; and
    a parking floor cancel step for canceling the first parking floor when the first parking floor determined in the parking floor determination step and the remote-hall-call-device-installed floor are the same floor.

6. The elevator group supervisory control method according to claim 5, further comprising:
    a parking floor correction step for determining a second parking floor which is different from the remote-hall-call-device-installed floor and is intended for causing an empty car to be on standby after canceling the first parking floor in the parking floor cancel step.

7. The elevator group supervisory control method according to claim 6, wherein the parking floor correction step involves determining the second parking floor on the basis of the moving time required by a passenger in moving from a place where the remote hall call device is provided to an elevator hall on the remote-hall-call-device-installed floor.

8. The elevator group supervisory control method according to claim 6, further comprising:
    a car assignment limiting step for limiting assigning a prescribed call registration by a hall call device which is provided in the elevator hall to an empty car when the empty car is on standby at the second parking floor.

* * * * *